(12) United States Patent
Hsieh et al.

(10) Patent No.: US 6,351,334 B1
(45) Date of Patent: Feb. 26, 2002

(54) REFLECTIVE DIFFRACTION GRATING FOR USE IN DISPLAY DEVICES

(75) Inventors: Pao-Ju Hsieh, Hsinchu; Hui-Lung Kuo; Chih-Kung Lee, both of Taipei; Wen-Jong Chen, Shin-Dian, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/688,374

(22) Filed: Oct. 10, 2000

(51) Int. Cl.⁷ .......................... G02B 5/18; G02F 1/1335
(52) U.S. Cl. ...................... 359/571; 359/569; 359/572; 359/576; 359/581; 359/615; 359/619; 349/61; 349/95
(58) Field of Search ................. 359/566, 567, 359/568, 569, 570, 571, 572, 576, 581, 618, 619, 627, 628, 629, 634, 639, 615; 349/61, 95, 104, 105, 62, 113, 114

(56) References Cited

U.S. PATENT DOCUMENTS

| | | | | |
|---|---|---|---|---|
| 4,417,784 A | * | 11/1983 | Knop et al. | 359/568 |
| 4,798,448 A | * | 1/1989 | van Raalte | 349/95 |
| 4,838,645 A | * | 6/1989 | Mächler et al. | 359/571 |
| 5,119,231 A | * | 6/1992 | Nelson et al. | 359/576 |
| 5,600,486 A | * | 2/1997 | Gal et al. | 359/569 |
| 5,615,024 A | * | 3/1997 | May et al. | 359/575 |
| 5,682,265 A | * | 10/1997 | Farn et al. | 359/571 |
| 5,801,795 A | * | 9/1998 | Ogino | 349/61 |
| 6,188,529 B1 | * | 2/2001 | Koyama et al. | 359/618 |
| 6,262,786 B1 | * | 7/2001 | Perlo et al. | 349/95 |
| 6,278,552 B1 | * | 8/2001 | Ishihara et al. | 359/569 |

FOREIGN PATENT DOCUMENTS

| | | | | |
|---|---|---|---|---|
| JP | 62-293222 | * | 12/1987 | 359/566 |
| JP | 62-293223 | * | 12/1987 | 359/566 |
| JP | 04-081702 A | * | 3/1992 | |

* cited by examiner

Primary Examiner—Cassandra Spyrou
Assistant Examiner—John Juba, Jr.
(74) Attorney, Agent, or Firm—W. Wayne Liauh

(57) ABSTRACT

A reflective-type diffraction grating structure for use in color display devices such as liquid crystal displays (LCDs). It contains: (1) a plurality of micro-lenses each having a smooth top surface and a blazed zig-zag-shaped grating surface at the bottom; (2) an optical coating formed below the zig-zag-shaped grating surface; and (3) a reflective member formed below the optical coating. With the cooperative actions of the zig-zag-shaped grating surface, the optical coating layer, and the reflective member, an incident light, when reflected, is separated into repeated sequences of red, green, and blue color components and a black matrix segregating the red, green, and blue color components. A sequence of micro-light valves are placed in the path of the reflected incident light to block the undesired color components. The reflective-type diffraction grating structure dispenses with the need for the various layers of color filters. As a result, it improves the brightness of the image and reduces power consumption, as well as reducing the manufacturing cost.

14 Claims, 3 Drawing Sheets

REFLECTIVE DIFFRACTION GRATING FOR USE IN DISPLAY DEVICES

FIELD OF THE INVENTION

The present invention relates to a novel reflective-type diffraction grating structure useful in the manufacturing of color display devices. More specifically, the present invention relates to an improved color display device containing a novel reflective-type diffraction grating. The utilization of the novel reflective-type diffraction grating structure allows the color display device to operate without the need for color filters, as required in prior art color display devices. As result, the color display device of the present invention substantially improves the brightness of the displayed images, and reduces the amount of power consumption. The novel design of the reflective-type diffraction also allows a black shading matrix to be generated between the RGB color components for improved contrast in the images.

BACKGROUND OF THE INVENTION

With the wide proliferation of mobile consumer electronic devices such as cell phones, personal digital assistants (PDAs), etc, the need for associated parts, such as non-CRT-type flat panel displays with improved quality, also substantially increases. Liquid crystal displays (LCDs) are the most common types of non-CRT-type flat panel displays used in mobile communication devices.

Good brightness and low power consumption are two of the most important considerations in any display devices. These considerations become even more critical for LCD type plat panel displays commonly used in mobile communication devices. Brightness can greatly affect the visualizability of the mobile device. And manufacturers of mobile communication devices often have to make comprises between brightness and power consumption.

For conventional LCDs, color filters often constitute the largest share of the manufacturing cost, followed, in the order of their share of the manufacturing cost, by the electric driving-circuits and back-light assembly. Although the color filters function to allow light of a pre-defined color to pass therethrough, some absorption is inevitable, resulting in a loss in the intensity of the transmitted light.

U.S. Pat. No. 5,619,356 discloses a typical reflective-type liquid crystal display device. It include a first substrate, a second substrate, a liquid crystal layer interposed between the first substrate and the second substrate, electrodes for applying a voltage to the liquid crystal layer, a polarizing plate provided on a side of the liquid crystal layer on which the first substrate is provided, a reflective member provided on a side of the liquid crystal layer on which the second substrate is provided, and an optical compensation member provided between the polarizing plate and the liquid crystal layer. The display device disclosed in the '356 patent also describes the conventional approach of using color filters to provide RGB (red, green and blue) type color display. Color filters have very low color utilization efficiency. While it allows light of intended color to pass through, those of complementary color are absorbed and thus their energy wasted. Furthermore, the provision for black matrixes also adversely affects the extent of light openings, in addition to their action to absorb light. As a result, color filters cause the transmitted light to be substantially reduced, and the need for color filters increases the manufacturing cost. With a reflective-type liquid crystal display device, since light takes two passes, the amount of intensity loss is further magnified.

Japan Open Patent App. Nos. 5-249318 and 6-308332 disclose a transmitting diffraction-type grating to replace the color filters as part of color display devices. The purpose of their design is to improve the utilization efficiency of the back light. In order to improve the proportion of first-order light and solve color positioning problems, their design requires that the back light be shined sideways. This requires a re-design of the back light assembly. The display disclosed in these Japanese patents also do not allow black matrixes, causing a great comprise in the contrast level of the displayed images.

U.S. Pat. No. 5,959,704 discloses a display device which contains a diffraction grating from which a diffracted light of the zero-th order and a diffracted light of the first order having different color light components emerge to establish color separation. The '704 invention also includes an array of micro-lenses which is arranged on a liquid crystal panel. The liquid crystal panel has a plurality of picture elements and each picture element includes a plurality of color display dots. The color display dots in each picture element are arranged in the vertical relationship and in the order of wavelength of the light. A green light component of diffracted light of the first order is made incident normal to the liquid, and the diffracted light of the zero-th order passes through the liquid crystal panel at a greater angle relative to the normal to the liquid crystal panel. Similar to the above-mentioned Japanese patents, the '704 patent uses a diffraction grating to replace the color filters, and the light was transmitted in a slanted manner. Also in both inventions, a significant amount of the photo energy (in the form of the zeroth order light) is lost. The display disclosed in the '704 patent further provides shadings to improve the contrast; however, this causes a portion of the incident light to be absorbed by the black shadings, and thus adversely affecting the utilization efficiency of the incoming light.

U.S. Pat. No. 5,943,109 discloses a liquid crystal display device which includes a hologram layer having predetermined patterns corresponding to patterns of a color filter. In the '109 patent, light inputted to the LCD device is transmitted through the hologram layer when reflected by a reflection layer out of the LCD device. The '109 patent uses a combination of diffraction grating and color filters to display color pixels; however, since color filters are used, most of the prior art problems still exist.

It is thus desirable to develop a color display device with improved energy utilization so as to improve visualizability and reduce power consumption, while also reducing the manufacturing cost.

SUMMARY OF THE INVENTION

The primary object of the present invention is to develop a reflective-type diffraction grating structure that will allow a color display device, such as a color crystal liquid display (LCD), to display color images without the use of color filters. More specifically, the primary object of the present invention is to develop a reflective-type diffraction grating structure that will allow a color display device to operate with improved brightness and reduced power consumption, by eliminating the need for color filters. Since color filters are typically the most expensive components of a color display device, the novel reflective-type diffraction grating structure of the present invention not only will improve the performance of the color display device, it will also substantially reduce its manufacturing cost.

The reflective-type diffraction grating structure disclosed in the present invention comprises the following key elements:

(1) a plurality of micro-lenses each having a zig-zag-shaped blazed grating surface in its bottom; and (1) an optical coating provided on the zig-zag-shaped grating surface;

(3) a reflective member formed below the optical coating.

One of the key elements of reflective-type diffraction grating structure of the present invention is that, with the novel structure as described above, the optical coating can be easily designed so that the reflected and diffracted light will be separated into red, green, and blue components that are cyclically arranged in series and in that order, and each of the RGB color components are segregated by a black shading.

In the first preferred embodiment of the present invention, the reflective member is formed in the form of a zig-zag shaped coating matching the shape of, and parallel to, the zig-zag shaped optical coating.

The second preferred embodiment of the present invention does not have a matching zig-zag shaped reflective coating underneath the zig-zag shaped optical coating. Rather, the zig-zag shaped optical coating is formed on, but spaced apart from, a flat substrate. The space between the zig-zag shaped optical coating and the flat substrate is filled with air or an optical material such as a polymer gel having different refraction index from both the substrate and the micro-lenses. Finally, a reflective coating is formed on the bottom of the flat substrate.

With either of the preferred embodiments of the present invention, the incident light will be reflected and separated into a sequence of cyclically arranged red, green, and blue color components, each being segregated by a black shading. Each of the undesired color components can be filtered out by an appropriate light valve. Since the RGB components are separated prior to their entering the light valves, the intensity of the desired color component will not be reduced as it would when it travels through a color filter. As a result, the brightness of the color display device utilizing the novel reflective-type diffraction grating structure of the present invention will be substantially greater than that of prior art devices utilizing color filters. Furthermore, the ability of the reflective-type diffraction grating structure of the present invention, in combination with the optical coating formed on the grating surface, to generate black shadings also greatly improves the contrast level of the projected images.

The micro-lense can have a spherical or aspherical surface; its main functions are to focus the incident light beam and define the positions of the color pixels. The number of the micro-lenses is defined by the required display resolution. For example, with a required display resolution of 64×128, 8,192 micro-lenses will be provided. The design of the zig-zag shaped grating surface is to separate the incident light beam into red, green, and blue lights of approximately equal energy. The ridges of the zig-zag grating surface do not have to be a straight line.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

The present invention discloses a novel reflective-type diffraction grating structure that allows a color display device, such as a color crystal liquid display (LCD), to display color images without the need for color filters. By eliminating the need for color filters, the resultant color display device will have improved brightness and reduced power consumption. Not only will the novel reflective-type diffraction grating structure of the present invention improve the performance of the color display device, since color filters constitute one of the most expensive components of a color display device, it can also substantially reduce its manufacturing cost.

As provided above, the reflective-type diffraction grating structure of the present invention comprises three key elements:

(1) a plurality of micro-lenses each having a blazed zig-zag-shaped grating surface;

(2) an optical coating on the zig-zag-shaped grating surface of the micro-lenses; and (3) a reflective member formed below the optical coating.

The combination of the blazed zig-zag-shaped grating surface and the reflective member causes diffraction to occur when light is reflected therefrom. In order to achieve the optimum performance, the optical coating is provided which is designed so that the reflected light is separated into red, green, and blue components that are cyclically arranged in series and in that order at pre-defined positions, and each neighboring pair of the RGB color components are segregated by a black shading. A number of commercial tools, such as a design software program GSolver from Grating Solver Development Co, are available to design an optimum optical coating for this purpose. Since this step is well known in the art, it will not be discussed in detail in this disclosure.

Figure 1:
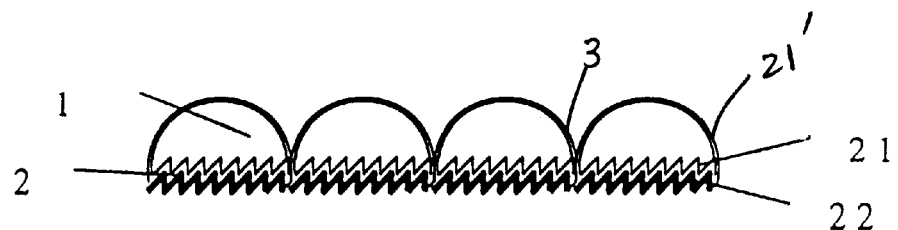
FIG. 1 is a schematic drawing showing the first embodiment of the reflective-type diffraction grating structure of the present invention in which a reflective member is formed in the form of a zig-zag shaped layer matching the shape of the zig-zag optical coating.
Figure 3:
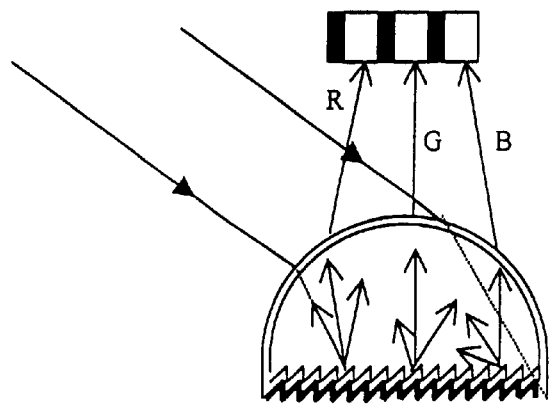
FIG. 3 is a schematic drawing showing the mechanism by which the incident light is reflected and separated into a sequence of red, green, and blue color elements that are respectively separated by black shadings, according to the first embodiment of present invention.

There are several ways to provide the reflective member. FIG. 1 is a schematic drawing showing the first embodiment of the reflective-type diffraction grating structure of the present invention in which a reflective member is formed in the form of a zig-zag-shaped coating matching the shape of the zig-zag optical coating. And FIG. 3 is a schematic drawing showing the mechanism by which the incident light is reflected and separated into a sequence of red, green, and blue color elements that are respectively separated by black shadings, according to the first embodiment of present invention.

FIG. 1 shows that the reflective-type diffraction grating structure comprises a plurality of micro-lenses 1, each having a smooth convex surface 3 at the top and a blazed zig-zag-shaped grating surface 2 at the bottom. The zig-zag-shaped surface can be formed to have a right angle. An optical coating 21 is formed on the blazed zig-zag-shaped grating surface 2. The optical coating 21 also has a zig-zag shape. Another optical coating 21', which can be made of the same material as optical coating 21, is coated on the top surface 3 of the micro-lenses 1. A reflective member 22 is formed also in the form of a zig-zag shaped coating, matching the shape of the zig-zag shaped optical coating 21. FIG. 3 shows that the incident light is reflected and (then) diffracted to form a serial arrangement of red, green, and blue color components at pre-defined positions, and these color components are respectively segregated by black shadings.

Figure 2:
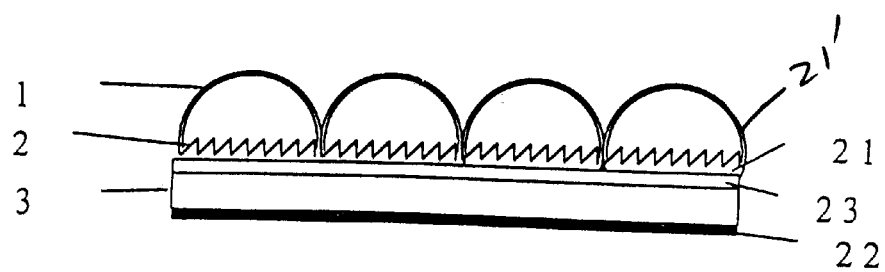
FIG. 2 is a schematic drawing showing the second embodiment of the reflective-type diffraction grating structure of the present invention in which the reflective member is formed on the bottom of a flat substrate.
Figure 4:
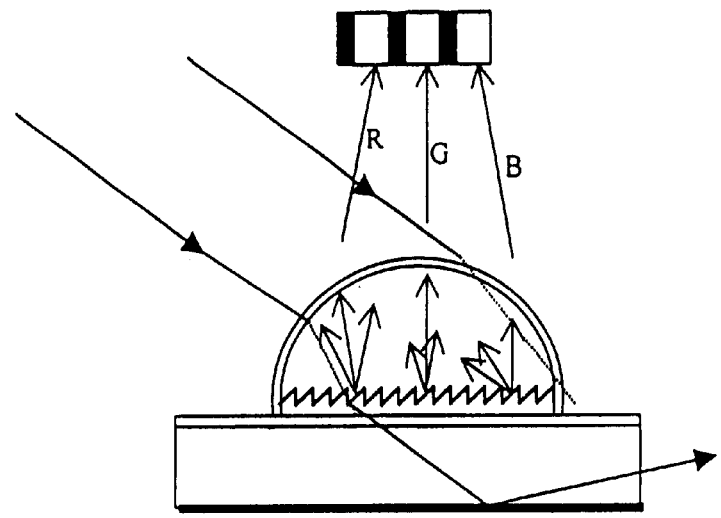
FIG. 4 is a schematic drawing showing the mechanism by which the incident light is reflected and separated into a sequence of red, green, and blue color elements that are respectively separated by black shadings, according to the second embodiment of present invention.

FIG. 2 is a schematic drawing showing the second embodiment of the reflective-type diffraction grating structure of the present invention in which the reflective member is formed on the bottom of a flat substrate. And FIG. 4 is a schematic drawing showing the mechanism by which the incident light is reflected and separated into a sequence of red, green, and blue color elements that are respectively separated by black shadings, according to the second embodiment of present invention.

In the second preferred embodiment, the zig-zag shaped optical coating is formed on, but spaced apart from, a flat transparent substrate. The space between the zig-zag shaped optical coating and the flat substrate is filled with air or an optical material such as a polymer gel having a different refraction index from both the substrate and the micro-lenses. Finally, a reflective coating is formed on the bottom of the flat substrate. One of the main differences between the second embodiment and the first embodiment is that, in the second embodiment, the optical coating has a zig-zag top surface, but a flat bottom surface.

With either of the preferred embodiments of the present invention, the incident light is reflected and, as a result of the combination of the diffraction grating surface and the specially designed optical coating, separated into a sequence of periodically arranged red, green, and blue color components at respectively pre-defined positions, and the color components are segregated by black shadings. When used in a color display device, undesired (or complementary) color components can be filtered out by appropriate light valves. Since the RGB components are separated prior to their entering the light valves, the intensity of the intended color component will not be reduced to the same extent as it would be when it travels through the conventional color filter. As a result, the brightness of the color display device will be substantially greater than that of prior art devices utilizing color filters. Furthermore, the ability of the reflective-type diffraction grating structure of the present invention to generate black shadings also greatly improves the level of contrast of the projected images.

Figure 6:
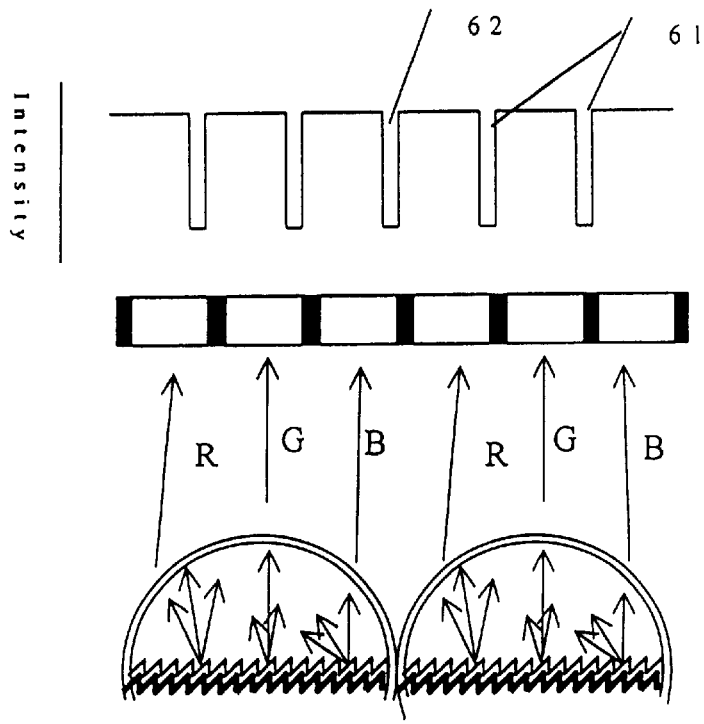
FIG. 6 is a schematic drawing showing the mechanism by which the incident light is reflected and separated into repeated sequences of red, green, and blue color elements that are respectively separated by black shadings, using a plurality of the micro-lenses of the present invention.

FIG. 6 is a schematic drawing showing the mechanism by which the incident light is reflected and separated into repeated sequences of red, green, and blue color elements that are respectively segregated by black shadings (or black matrix), using a plurality of the reflective-type diffraction grating structure of the present invention. With optimization, which can be achieved using known techniques, the optical coating of the reflective-type diffraction grating structure of the present invention can be designed so that the transmitted light approaches maximum possible intensity, and that the individual color components are separated by a shading of very low light intensity (i.e. black). The combination of the zig-zag surface and the optical film also causes essentially the entire zero-th order energy to be converted to first order energy. This further greatly enhances the energy utilization efficiency of the display device, as well as minimizing the problems associated with the diffraction of light with zero-th order energy.

Figure 7:
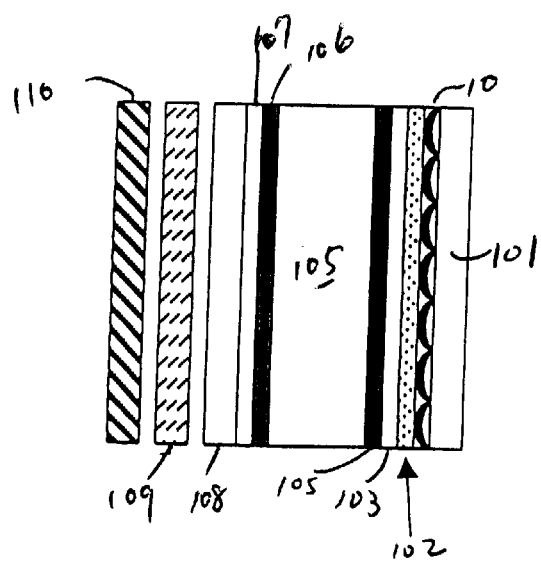
FIG. 7 is a schematic drawing showing the reflective-type diffraction grating structure of the present invention is incorporated into a liquid crystal display (LCD).

Furthermore, FIG. 7 is a schematic drawing showing the reflective-type diffraction grating structure of the present invention is incorporated into a liquid crystal display (LCD), which comprises, in the order from the base, a first glass layer 101, the reflective-type diffraction grating structure 10, a leveling layer 102, a first ITO layer 103, a first alignment layer 104, a liquid crystal layer 105, a second ITO layer 106, a second alignment layer 107, a second glass layer 108, a retardation film 109, and a polarizer 110.

The micro-lense can have a spherical or aspherical surface; its main functions are to focus the incident light beam and define the positions of the color pixels. The number of the micro-lenses is defined by the required display resolution. For example, with a required display resolution of 64×128, 8,192 micro-lenses will be provided. The design of the zig-zag grating surface structure is to separate the incident light beam into red, green, and blue lights of approximately equal energy. The ridges of the zig-zag surface do not have to be a straight line.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

The purpose of this example is to show that the reflective-type diffraction grating structure of the present invention can be designed, using available simulation technology, to form black gratings separating neighboring color components.

A multi-layer optical coating is designed to contain 56 layers of optical coatings having the composition as shown in Table 1:

TABLE 1

| thin coating material (odd-numbered layer) | Thickness (nm) | thin coating material (odd-numbered layer) | Thickness (nm) |
|---|---|---|---|
| $SiO_2$ | 33.85 | $ZrO_2$ | 7.00 |
| $SiO_2$ | 29.96 | $ZrO_2$ | 102.00 |
| $SiO_2$ | 164.54 | $ZrO_2$ | 83.78 |
| $SiO_2$ | 23.77 | $ZrO_2$ | 33.10 |
| $SiO_2$ | 166.08 | $ZrO_2$ | 120.48 |
| $SiO_2$ | 13.43 | $ZrO_2$ | 13.15 |
| $SiO_2$ | 148.04 | $ZrO_2$ | 70.82 |
| $SiO_2$ | 195.25 | $ZrO_2$ | 29.77 |
| $SiO_2$ | 12.21 | $ZrO_2$ | 64.33 |
| $SiO_2$ | 154.17 | $ZrO_2$ | 4.99 |
| $SiO_2$ | 126.05 | $ZrO_2$ | 173.83 |
| $SiO_2$ | 44.53 | $ZrO_2$ | 7.04 |
| $SiO_2$ | 232.05 | $ZrO_2$ | 66.28 |
| $SiO_2$ | 176.24 | $ZrO_2$ | 17.93 |
| $SiO_2$ | 53.53 | $ZrO_2$ | 30.87 |
| $SiO_2$ | 153.36 | $ZrO_2$ | 79.33 |
| $SiO_2$ | 243.02 | $ZrO_2$ | 40.03 |

TABLE 1-continued

| thin coating material (odd-numbered layer) | Thickness (nm) | thin coating material (odd-numbered layer) | Thickness (nm) |
|---|---|---|---|
| SiO$_2$ | 37.15 | ZrO$_2$ | 16.25 |
| SiO$_2$ | 251.54 | ZrO$_2$ | 45.58 |
| SiO$_2$ | 3.03 | ZrO$_2$ | 24.05 |
| SiO$_2$ | 227.33 | ZrO$_2$ | 7.36 |
| SiO$_2$ | 25.03 | ZrO$_2$ | 10.56 |
| SiO$_2$ | 179.85 | ZrO$_2$ | 61.52 |
| SiO$_2$ | 208.83 | ZrO$_2$ | 117.97 |
| SiO$_2$ | 144.22 | ZrO$_2$ | 3.71 |
| SiO$_2$ | 68.11 | ZrO$_2$ | 105.40 |
| SiO$_2$ | 179.98 | ZrO$_2$ | 25.02 |
| SiO$_2$ | 7.12 | ZrO$_2$ | 83.14 |

Figure 5:
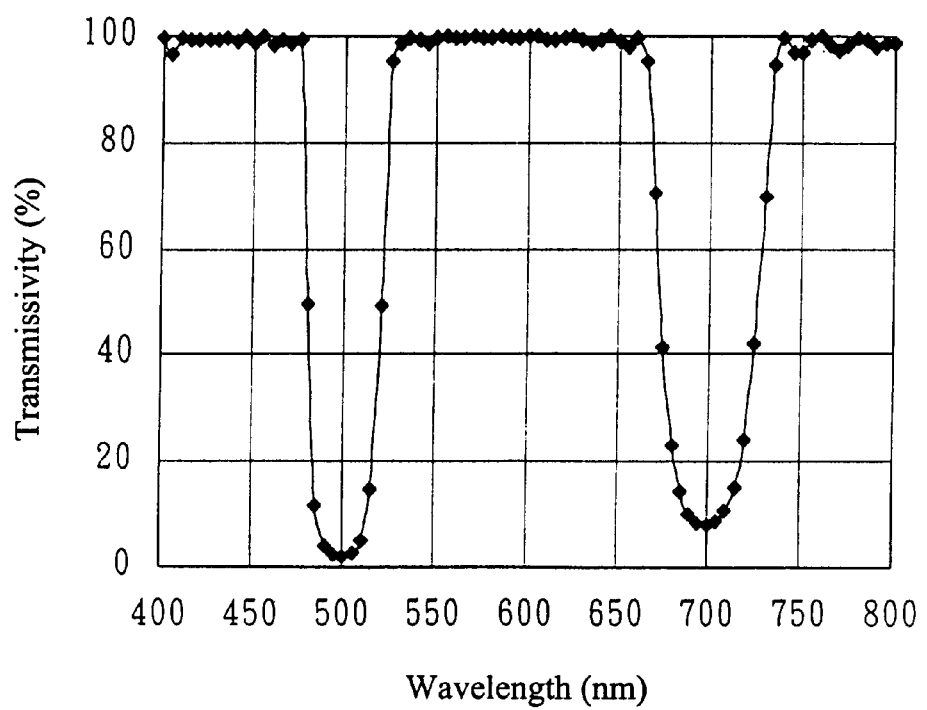
FIG. 5 is a calculated transmissivity vs. wavelengths plot for the light that has been reflected from the reflective-type diffraction grating structure of Example 1.

FIG. 5 is a calculated transmissivity vs. wavelength plot for the light that has been reflected from the reflective-type diffraction grating structure having an optical coating whose composition is as shown in Table 1. The simulation results show that even with such as simple SiO$_2$/ZrO$_2$ the transmissivities for the desired RGB color components can be made to be essentially 100%, while black shadings (0% transmissivity) is obtained for wavelengths that are not in the intended RGB range.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A reflective-type diffraction grating structure comprising:
   (1) a plurality of micro-lenses each having a zig-zag-shaped grating surface in a bottom of said micro-lenses;
   (2) an optical coating formed on said zig-zag-shaped grating surface; and
   (3) a reflective member formed below said optical coating;
   (4) wherein said optical coating, said zig-zag shaped grating surface, and said reflective member cooperatively cause an incident light to form a series of red, green, and blue color components at predefined positions, and said red, green, and blue color components are respectively segregated by black shadings.

2. The reflective-type diffraction grating structure according to claim 1 wherein said optical coating also has a zig-zag shaped bottom surface matching said zig-zag shaped grating surface of said micro-lenses.

3. The reflective-type diffraction grating structure according to claim 2 wherein said reflective member has a zig-zag shaped surface matching said zig-zag shaped grating surface of said optical coating.

4. The reflective-type diffraction grating structure according to claim 1 wherein said reflective member comprises:
   (a) a flat transparent substrate formed below said optical coating in a spaced apart manner;
   (b) a transparent material filled between said optical coating and said flat substrate, said transparent material having a different refraction index than both said substrate and said micro-lenses; and
   (c) a reflective coating formed on a bottom of said flat substrate.

5. The reflective-type diffraction grating structure according to claim 1 which further comprises an external optical coating formed on a top surface of said micro-lenses.

6. The reflective-type diffraction grating structure according to claim 1, wherein said zig-zag-shaped grating surface has an angle of about 90 degrees.

7. The reflective-type diffraction grating structure according to claim 1 wherein said optical coating comprises a plurality of alternating layers of SiO$_2$ and ZrO$_2$.

8. A liquid crystal display (LCD) containing a liquid crystal, at least one ITO layer and a reflective-type diffraction grating structure, wherein said reflective-type diffraction grating structure comprises:
   (a) a plurality of micro-lenses each having a zig-zag-shaped grating surface in a bottom of said micro-lenses;
   (b) an optical coating formed on said zig-zag-shaped grating surface; and
   (c) a reflective member formed below said optical coating;
   (d) wherein said optical coating, said zig-zag shaped grating surface, and said reflective member cooperatively cause an incident light to form a series of red, green, and blue color components at predefined positions, and said red, green, and blue color components are respectively segregated by black shadings.

9. The liquid crystal display according to claim 8 wherein said optical coating also has a zig-zag shaped bottom surface matching said zig-zag shaped grating surface of said micro-lenses.

10. The liquid crystal display according to claim 8 wherein said reflective member has a zig-zag-shaped surface matching said zig-zag-shaped grating surface of said optical coating.

11. The liquid crystal display according to claim 8 wherein said reflective member comprises:
   (a) a flat transparent substrate formed below said optical coating in a spaced apart manner;
   (b) a transparent material filled between said optical coating and said flat substrate, said transparent material having a different refraction index than either said substrate or said micro-lenses; and
   (c) a reflective coating formed on a bottom of said flat substrate.

12. The liquid crystal display according to claim 8 wherein said reflective-type diffraction grating structure further comprises an external optical coating formed on an outer surface of said micro-lenses.

13. The liquid crystal display according to claim 8, wherein said zig-zag-shaped grating surface has an angle of about 90 degrees.

14. The liquid crystal display according to claim 8 wherein said optical coating comprises a plurality of alternating layers of SiO$_2$ and ZrO$_2$.

* * * * *